G. W. LINGLE.
WHEEL RIM AND SPROCKET TEETH THEREFOR.
APPLICATION FILED NOV. 9, 1918.
1,327,107.
Patented Jan. 6, 1920.
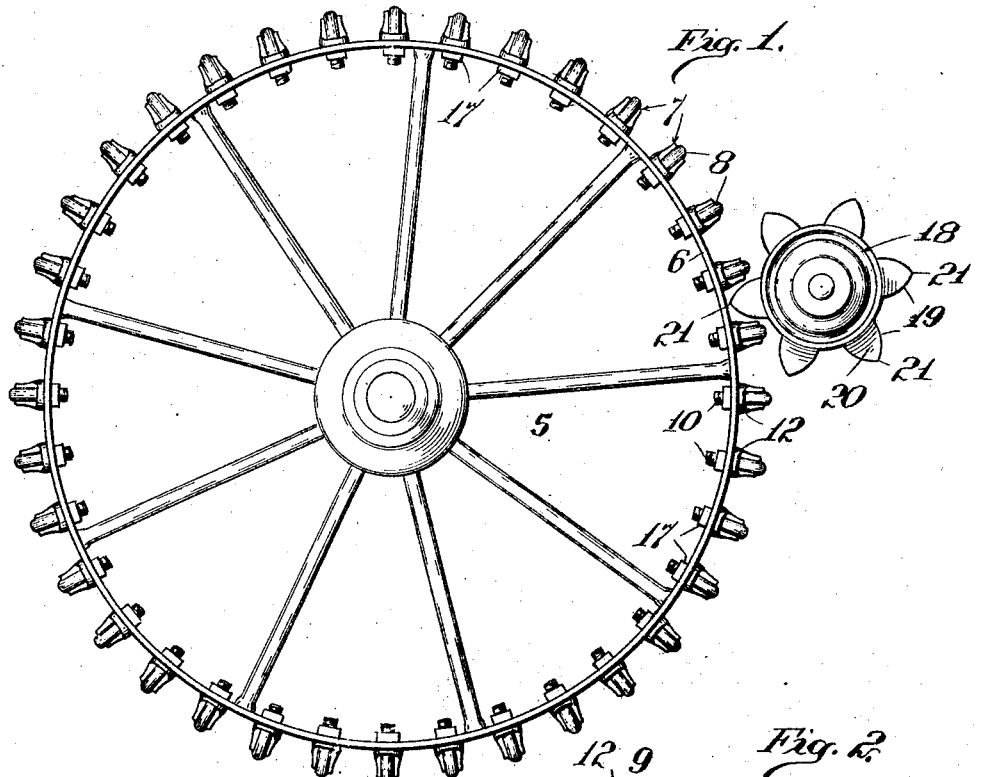
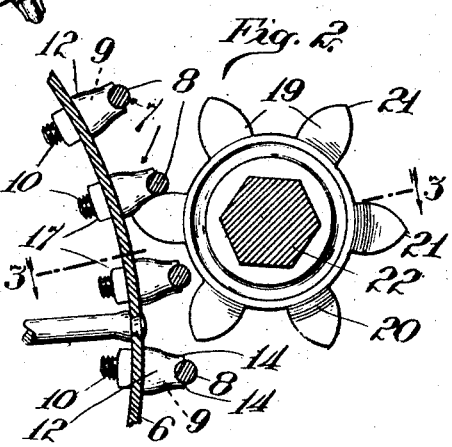
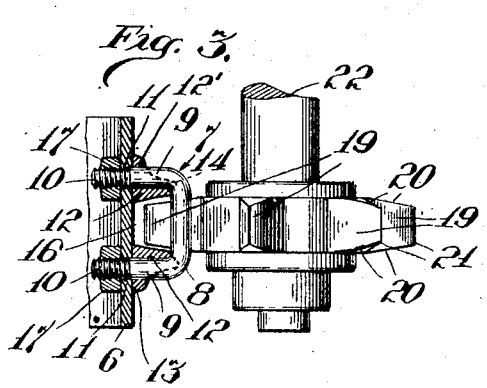
Witnesses
Inventor.
George W. Lingle

UNITED STATES PATENT OFFICE.

GEORGE W. LINGLE, OF SILVER LAKE, WISCONSIN, ASSIGNOR OF TWO-FIFTHS TO WILBUR O. CARNEY, OF CHICAGO, ILLINOIS.

WHEEL-RIM AND SPROCKET-TEETH THEREFOR.

1,327,107.   Specification of Letters Patent.   Patented Jan. 6, 1920.

Application filed November 9, 1918. Serial No. 261,822.

*To all whom it may concern:*

Be it known that I, GEORGE W. LINGLE, a citizen of the United States of America, residing at Silver Lake, in the county of Kenosha and State of Wisconsin, have invented certain new and useful Improvements in Wheel-Rims and Sprocket-Teeth Therefor, of which the following is a specification.

My invention relates to improvements in wheel rims and sprocket-teeth therefor, and the principal objects of my improvement are:

First, to provide detachable sprocket teeth circumferentially mounted on a wheel rim parallel with the axis of the wheel and reinforced against radial crush of the teeth;

Second, to afford a wheel rim having detachable sprocket-teeth reinforced radially and in the plane of bodily rotation of said sprocket-teeth for reinforcement against injury to said teeth;

Third, the provision of a sprocket wheel capable of transmitting power to said sprocket-teeth on said wheel rim; and Fourth, to produce a construction whereby to obtain not speed but great strength and quick repair in case of breakage or injury to one or more sprocket-teeth.

With the above and other objects in view, my invention consists in the novel features and in the novel combination and arrangement of parts hereinafter fully described, illustrated in the accompanying drawings forming a part of this specification, and particularly pointed out in the claims hereunto appended; it being understood that changes, variations and modifications in the details of the invention within the scope of the claims, may be resorted to without departing from the spirit or sacrificing any of the advantages thereof.

In the drawings,

Figure 1 is a side elevation of a wheel and its rim with my sprocket-teeth circumferentially mounted thereon externally of the rim.

Fig. 2 is an end elevation of the sprocket-wheel and a fragment of the wheel rim with sprocket teeth thereon.

Fig. 3 is a cross section on line 3—3 on Fig. 2.

Fig. 4 is a perspective view of a reinforcing member for the sprocket-teeth.

Similar numerals refer to similar parts throughout the several views.

A wheel 5 is formed with a rim 6 on which are circumferentially mounted externally of the rim 6 parallel to the axis of the wheel 5 what are termed sprocket-teeth 7 formed of steel rod bent to present a central portion 8 and parallel portions 9, having screw threaded free ends 10. Apertures 11 in the rim 6 are in line with the axis of the wheel 5. A reinforcing member 12 having a comparatively wide base 13, an apex 14, and a recess 15 therein provides additional strength or reinforcement of each sprocket-tooth radially and in the plane of bodily rotation of said sprocket-teeth against injury to said teeth 7. The ends of the central portion 8 are normally seated in the recesses 15 of the reinforcing members at their outer ends. The base 13 of each member 12 has an axial opening 12' therethrough to receive one of the parallel portions 9. Between the ends of each sprocket-tooth 7 is what is termed a clearance space 16, nuts 17 serve to secure the teeth 7 to the rim 6.

A sprocket-wheel 18 has teeth 19 which are laterally tapered, 20 to the point 21, this tapering pointed tooth facilitates clearing the space 16 of any accumulation of earth or other substance, it being remembered that the sprocket-teeth 7 serve also as an aid to traction, particularly in the case of tractors. The shaft 22 is connected with a source of power (not shown).

By my present improvement a greater leverage is obtained in transmitting power from a sprocket-wheel 18 to the sprocket-teeth 7 mounted externally of the rim 6. Great power, not speed, results from such construction.

I wish it to be understood I do not limit my invention to the particular use which for the purposes of an understanding of the invention I have herein shown and described.

On reference to the drawings and the foregoing description it is thought the construction and operation of my improvement will be readily understood, therefore no further description is given.

By thus showing and specifically describing one embodiment of my invention I do not intend to restrict the range of equivalents not made necessary by the prior state of this art.

Having thus fully described my invention, what I claim as new, and desire to secure by Letters Patent, is—

1. A sprocket-tooth formed of steel rod and bent to present a central portion and parallel portions, and reinforcing members for said parallel portions.

2. A sprocket-tooth formed of steel rod and bent to present a central portion and parallel portions and reinforcing members for said parallel portions, said tooth having a space between said reinforcing members for travel of a sprocket-wheel tooth.

3. The combination with a wheel having a rim, of detachable sprocket-teeth formed of steel rod bent to present a central portion and parallel threaded portions and mounted circumferentially externally of said rim in line with the axis of said wheel, reinforcing means carried by each of said parallel threaded portions of said sprocket teeth and a sprocket-wheel for transmitting power to said sprocket teeth on said rim.

4. The combination with a wheel having a rim, of sprocket-teeth formed of steel rod and bent to present a central portion and parallel portions and reinforcing members for said parallel portions circumferentially mounted externally of said rim parallel to the axis of said wheel and a sprocket wheel for transmitting power to said sprocket-teeth on said rim.

5. The combination with a wheel rim, of an annular series of sprocket-teeth formed of steel rod each bent to present a central portion and parallel portions mounted circumferentially of said wheel rim and in line with the axis of said wheel, reinforcing members each having a comparatively wide base in contact with said rim and a recessed apex normally in contact with one end of said central portion each of said sprocket teeth having space between said reinforcing members, a sprocket-wheel in operative relation to said sprocket-teeth and a source of power to actuate said sprocket-wheel.

6. The combination of a wheel rim with an annular series of externally mounted sprocket teeth each comprising a length of steel rod bent to present a central portion and parallel portions, each of said parallel portions carrying a reinforcing member and means for detachably securing said sprocket teeth to said rim.

7. The combination with a wheel having a rim, of detachable sprocket-teeth formed of steel rod bent to present a central portion and parallel threaded portions and mounted circumferentially externally of said rim in line with the axis of said wheel, reinforcing members carried by said parallel threaded portions, each reinforcing member having a comparatively wide base in contact with said rim and a recessed apex normally in contact with one end of said central portion, each of said sprocket-teeth having a space between said reinforcing members and a sprocket-wheel for transmitting power to said sprocket teeth on said rim.

In testimony whereof I affix my signature.

GEORGE W. LINGLE.